INVENTORS
JOSEPH S. LORD
GEORGE P. BENTLEY
BY Pennie, Edmonds,
Morton, Taylor and Adams
ATTORNEYS

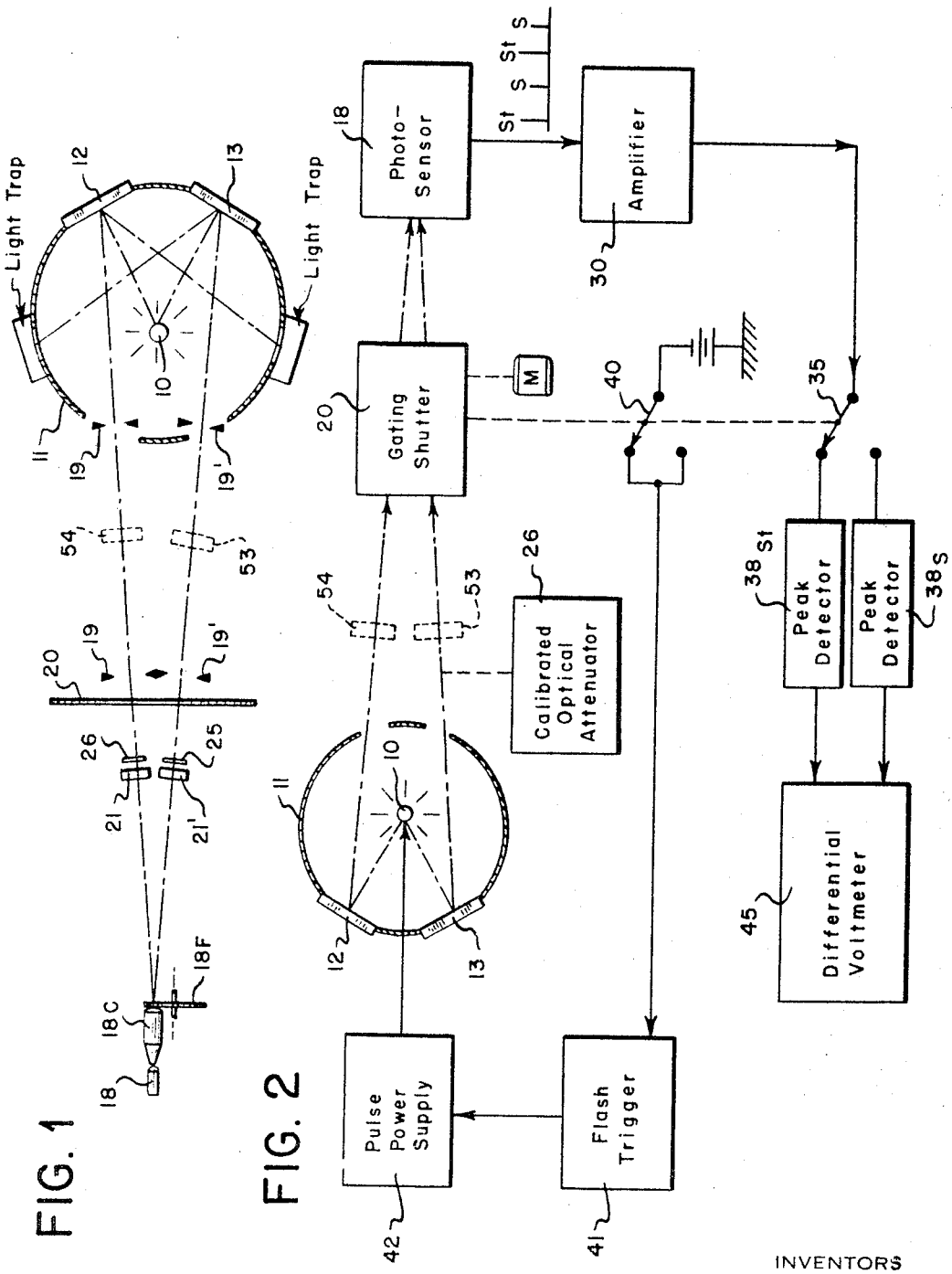

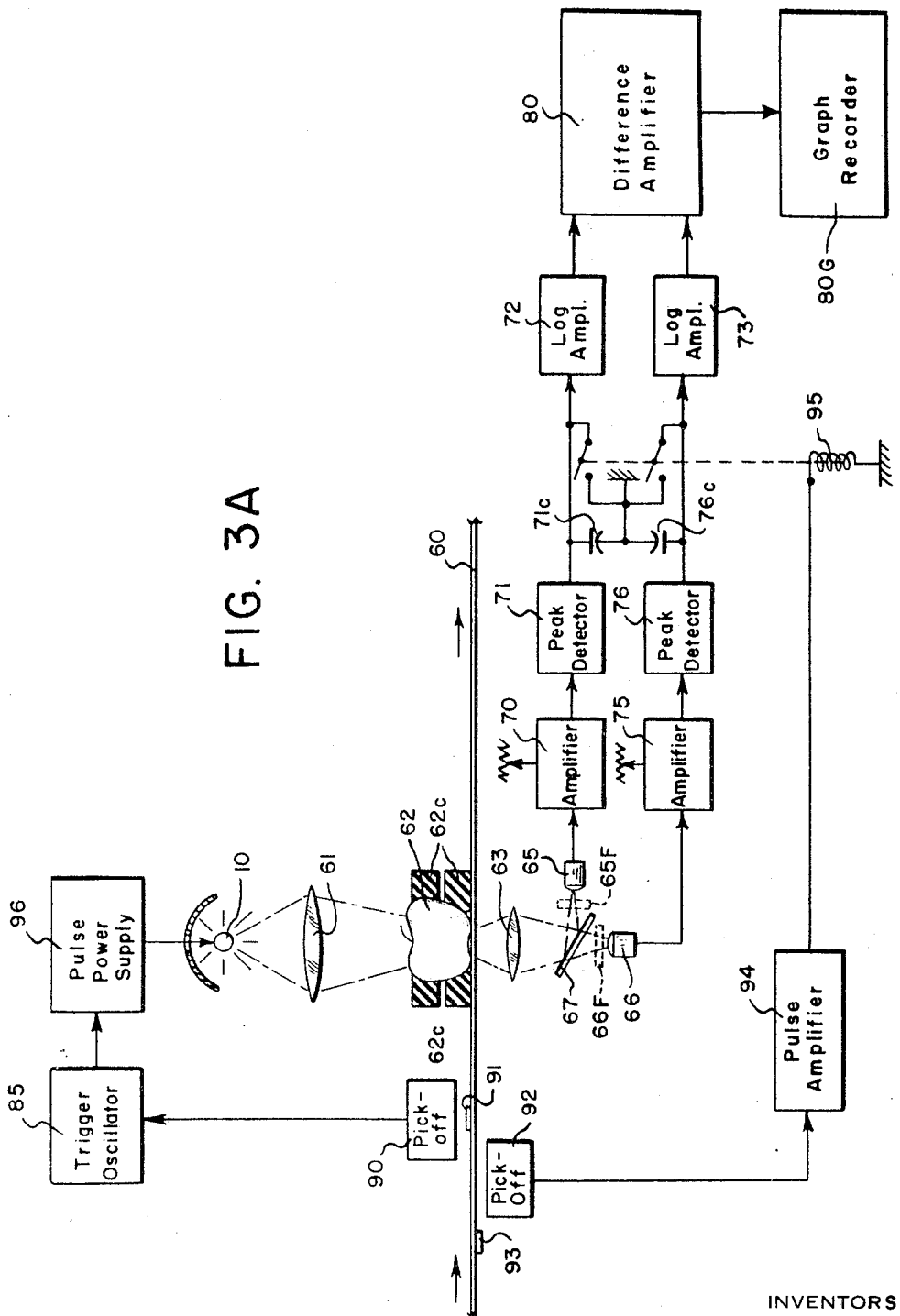

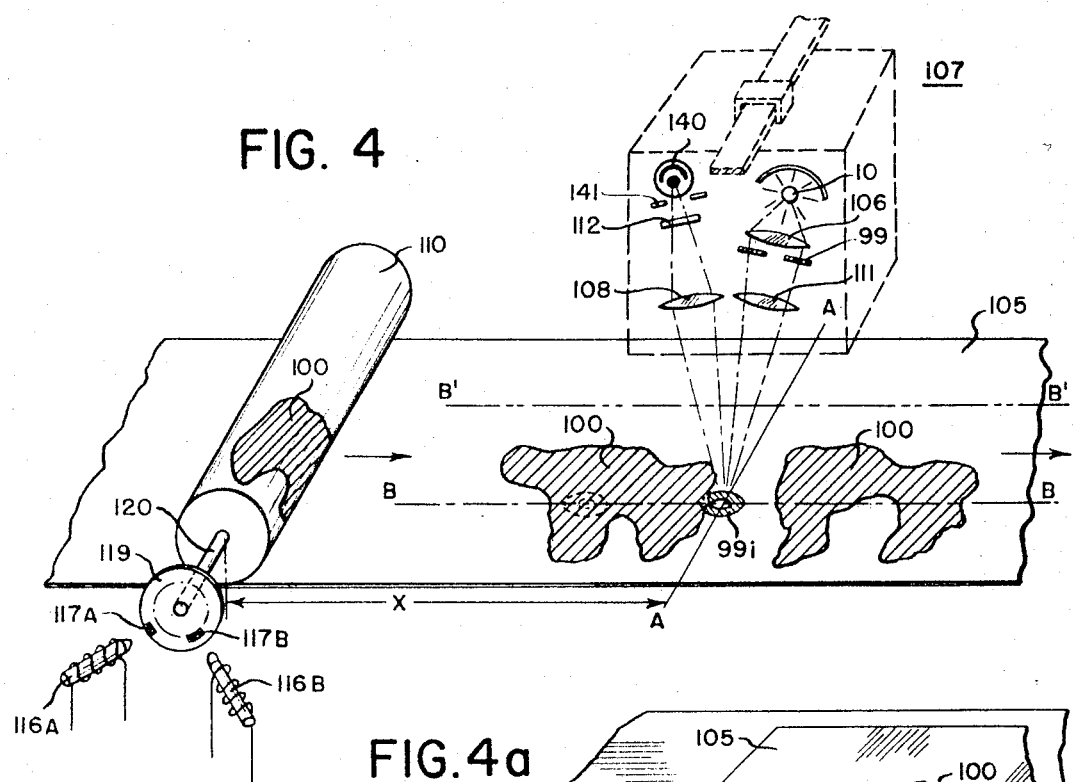
FIG. 4
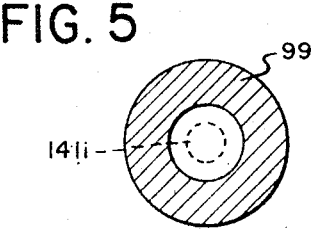
FIG. 5
FIG. 4a
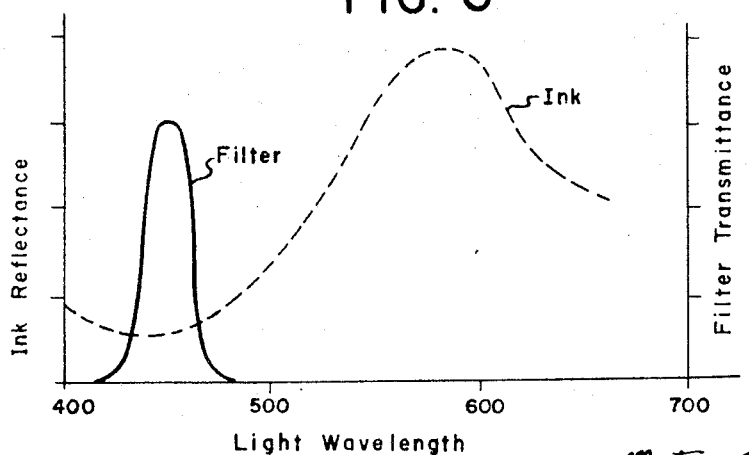
FIG. 6
INVENTORS
JOSEPH S. LORD
GEORGE P. BENTLEY
BY Pennie, Edmonds,
Morton, Taylor and Adams
ATTORNEYS

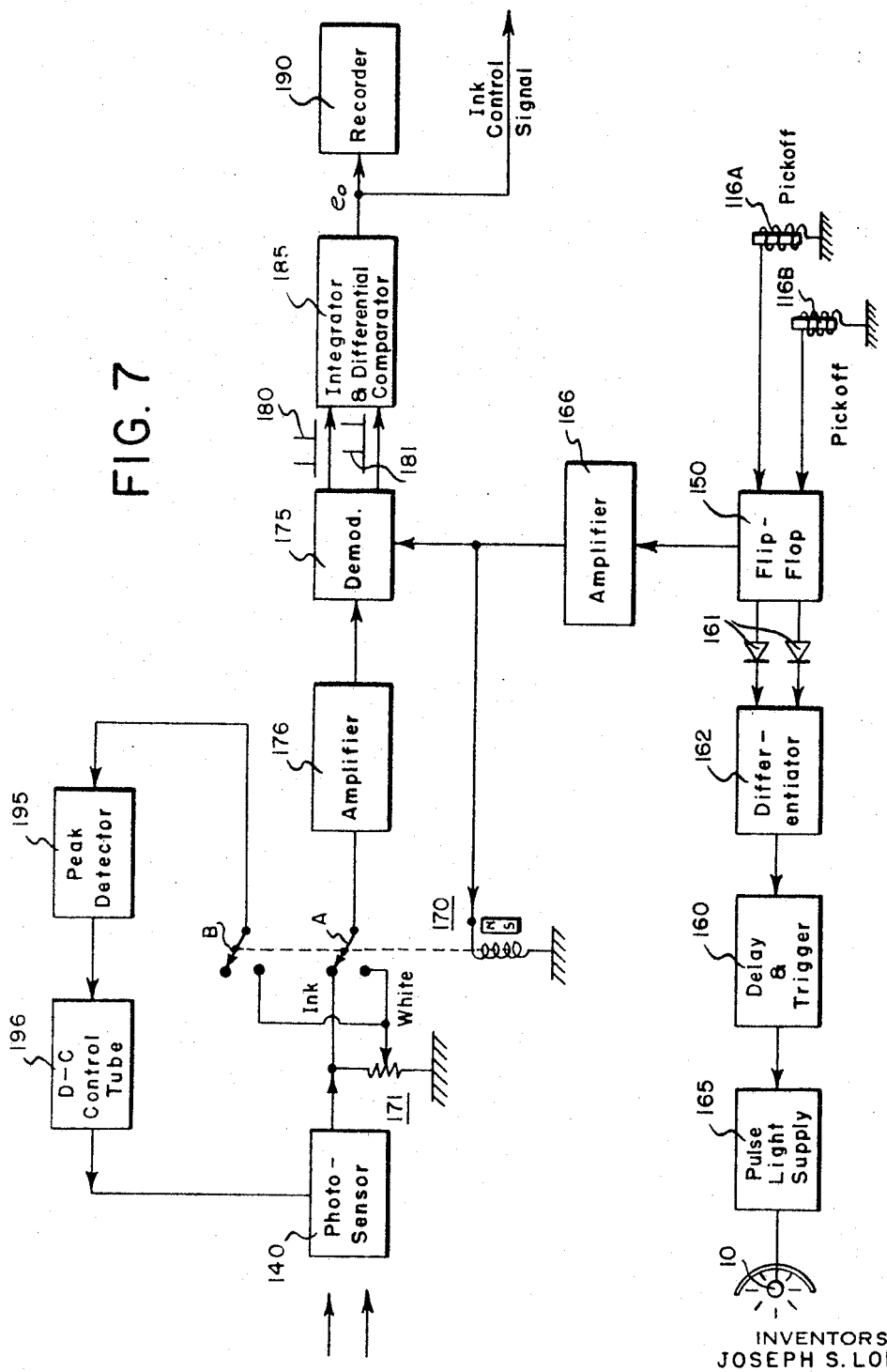

United States Patent Office 3,458,261
Patented July 29, 1969

1

3,458,261
PULSED LIGHT PHOTOMETRIC APPARATUS FOR MEASURING LIGHT CHARACTERISTICS OF MOVING MATERIALS
George P. Bentley, Amherst, and Joseph S. Lord, Walpole, Mass., assignors to Kollmorgen Corporation, Garden City, N.Y., a corporation of New York
Filed Sept. 25, 1964, Ser. No. 399,153
Int. Cl. G01n 21/18, 21/30; G01j 1/32
U.S. Cl. 356—199                              3 Claims

ABSTRACT OF THE DISCLOSURE

Photometric apparatus having a synchronously triggered high-intensity short-duration pulsed light source for measuring either the light reflectance or transmittance characteristics of moving materials or predetermined pattern areas of moving materials.

---

The present invention relates generally to photometers and more particularly to improved photometric methods and apparatus utilizing a high intensity pulsed light source for qualitatively and quantitatively evaluating either the light reflectance transmittance characteristics of moving or stationary sample materials.

Photometric methods and apparatus that have been proposed in the prior art which utilize continuous light sources have all generally been criticized as lacking in sensitivity and accuracy, particularly in applications involving the evaluation of materials having either low reflectance or low transmittance (high density) values. An example of the former is in the field of nigrometry where it is necessary to accurately measure the reflectance characteristics of extremely dark materials such as carbon black. With existing devices, a lower sensitivity is set, on the one hand, with a known limit imposed by available photocell sensitivity and on the other hand by the amount of heat from the continuous light source which can be dissipated by the sample before either the reflectance characteristic or the transmittance characteristic is altered or the sample itself destroyed. Furthermore, it has not been possible with available prior art devices to precisely measure the reflectance or transmittance characteristics of selected areas of patterns on objects or materials traveling at high speeds as contrasted to measuring the average large area values.

In accordance with the present invention the foregoing limitations of prior art photometric methods and apparatus are overcome by periodically illuminating the unknown sample material with extremely short-duration light pulses having a high brightness value, sensing the short-duration pulses of light reflected from or transmitted through the sample material, and measuring the peak value of the sensed light pulses to indicate the reflectance or transmittance characteristic of the sample material. In a preferred method, a standard sample is also illuminated with the above described light pulses and the pulses of light reflected from or transmitted through the standard are sensed, and the peak values differentially compared with those from the unknown. Colorimetric and spectrophotometric evaluations are effected by inserting appropriate color filters (e.g. tri-stimulus color filters) ahead of the photosensor.

In the preferred embodiment of the invention, a high intensity pulsed light source is utilized having an extremely short flash duration (e.g. between a millisecond and several microseconds). In applications requiring measurement of rapidly moving material such as the printed material from a printing press, the light source is time-synchronized to permit color reflectance of transmittance measurements.

As indicated above, the preferred embodiment of the invention utilizes a pulsed light source which is capable of producing relatively uniform high intensity light pulses on a repetitive basis. Utilization of short-duration pulses having a low duty cycle and high peak brightness greatly reduces the overall power requirements for the light power source and greatly minimizes heat dissipation problems while at the same time making it possible to utilize low cost solid-state photosensors. Furthermore, by utilizing a pulsed light source having high instantaneous brightness, the usual adverse effects of ambient light on measurement accuracy is effectively eliminated because of the large difference in brightness levels between the normal ambient illumination and the pulse illumination.

In accordance with one embodiment of the present invention, photometric apparatus is provided for measuring the ratio of pulse light transmittance of a given material for one wavelength or band of wavelengths. with respect to that for a second wavelength or band of wavelengths. In the preferred arrangement, a gated negative feedback control circuit is provided for controlling the gain of the photosensor (e.g. photomultiplier tube) in accordance with variations in amplitude of a selected reference signal.

It will be appreciated that an important advantage provided by the present invention resides in the ability of the photometric apparatus to reliably measure the reflectance or transmittance characteristics of objects moving at high speeds. The pulsed light source is accurately time-synchronized with the particular transport mechanism (e.g. printing press) so as to effectively freeze the motion or "strobe" the object or selected print area so that the photosensor sees only the particular areas of interest.

Because of the low average power requirement of the pulsed light source and the great increase in peak illumination that is made possible with the use of such light sources, highly accurate and sensitive portable nigrometers, colorimeters, and spectrophotometers may be practically and economically constructed for the first time.

The foregoing and other features and advantages of the present invention will be apparent from the following more particular description of a preferred embodiment of the invention, as illustrated in the accompanying drawings in which:

FIG. 1 is a simplified optical diagram illustrating a pulsed light photometer in accordance with the present invention;

FIG. 2 is an electrical block diagram of the pulsed light photometer illustrated in FIG. 1;

FIG. 3A is a simplified optical and electrical block diagram of a pulse-light photometer for measuring the light transmittance characteristics of a sample material at two different wavelengths;

FIG. 4 is a perspective drawing illustrating the operation of a synchronized pulse light photometer for continuously measuring the light reflectance of repeated patterns printed by a high speed printing press;

FIG. 4A is a simplified perspective drawing illustrating a photocell detector for producing pulse-light synchronizing pulses by direct scanning of the print sheet;

FIG. 5 illustrates a preferred field stop for the pulse light optical system shown in FIG. 4.

FIG. 6 is a graph which generally illustrates the transmittance characteristic of a preferred pulse light filter with respect to the reflectance characteristic of a given ink to be measured; and FIG. 7 is an electrical block diagram for the pulse light photometer illustrated in FIG. 4.

Figure 3B:
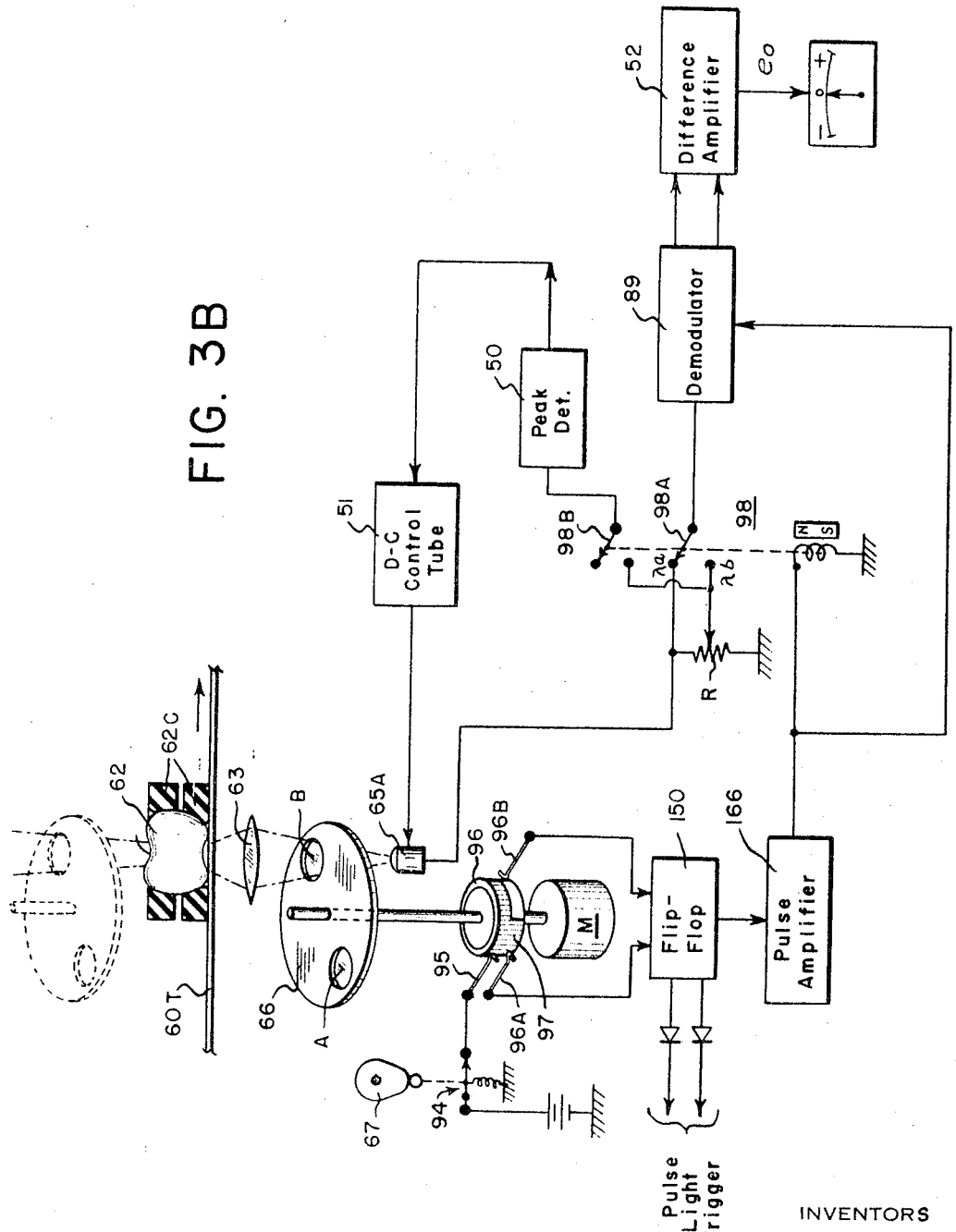
FIG. 3B is a simplified optical and electrical block diagram of a pulse-light photometer for sequentially measuring the light transmittance characteristics of a sample material at two different wavelengths.

Referring to FIG. 1, there is shown a flash lamp 10, centrally mounted in a light integrating sphere 11, adapted to periodically illuminate the surfaces of a standard material 12 and a sample material 13. Lamp 10 may alternatively be located external to the sphere so that light enters the sphere through a port, the preferred arrangement depending on conditions of illumination desired. Flash lamp 10 may be selected from any one of a number of available light sources that are capable of producing short-duration light pulses having a high brightness value throughout a desired output spectrum. Such sources include gas discharge lamps, lasers etc. The FX–6A Xenon lamp, manufactured by Edgerton, Germeshausen and Grier, has been found to be highly satisfactory in its performance because of its high peak brightness and wide output spectrum ranging from the ultraviolet through the visible range and well into the infrared. It should be noted that such a lamp with an appropriate reflector and condenser optical system is capable of flash illuminating a one inch diameter spot at a brightness level of around 800,000 lumens.

Short-duration light pulses from lamp 10 are reflected from 12 and 13 alternately focused on photocell 18 through light conduit 18C after passing through stray light stops 19 and 19', rotating gating shutter 20 and lenses 21 and 21'. Adjustable aperture 25 is provided to correct for mechanical and optical imbalances between the individual optical systems and calibrated variable aperture 26 is preferably provided for measuring relatively large differences between the reflectance values of the respective sample and standard materials. The rotation of shutter 20 is electro-mechanically synchronized with the energization of lamp 10 so that photocell 18 alternately views light pulses reflected from 12 and 13. In practice, the time duration of the light pulses reflected from 12 and 13 is defined solely by the time duration of the pulses from lamp 10 and is in no way modulated or shortened by shutter 20. The function of gating shutter 20 is to alternately blank from the view of photocell 18 the reflected light pulses from either 12 or 13. As illustrated in FIG. 1, colorimetric measurements are made by sequentially rotating color filter wheel 18F containing appropriate color filters through the optical path of photocell 18.

An electrical block diagram of a preferred embodiment of a pulse light reflectance photometer is illustrated in FIG. 2. Alternate electrical output pulses $S_t$, $S$ from photosensor 18, produced by the reflected light pulses from 12 and 13 respectively, are supplied to and amplified by amplifier 30. The output pulses from 30 are supplied to synchronous demodulator switch 35 which is mechanically or electro-mechanically driven in synchronism with gating shutter 20. When the reflected light pulse from the standard 12 is focused through the opening in gating shutter 20 on photosensor 18, the resultant electrical output pulse $S_t$ is supplied to peak detector $38_{St}$. When the light reflected from sample 13 is passed through shutter 20 and focused on photosensor 18, the resultant output pulse $S$ is connected to peak detector $38_S$ by synchronous demodulator switch 35.

At the same time synchronizing pulses, which are produced by the opening and closing of switch 40, are supplied to flash trigger circuit 41. The output trigger pulses from 41 are supplied to a high energy pulse-discharge power supply 42. The output of 42 is rapidly discharged across Xenon lamp 10 to produce a very high intensity short-duration light pulse. As illustrated in FIG. 2, switch 40 is also mechanically or electro-mechanically driven in synchronism with motor-driven rotating gating shutter 20.

The respective output signals from peak detectors $38_{St}$ and $38_S$ may be differentially or individually recorded on a graph recorder or other well-known indicator devices.

As shown in FIG. 2, the peak detector outputs are supplied to a differential voltmeter 45 which is advantageously calibrated to indicate the percentage difference in the reflectance values of the standard and sample materials.

One of the outstanding advantages of the pulse-light photometric apparatus provided by the present invention resides in the fact that the reflectance values of extremely dark materials, such as carbon black, may be accurately and reliably measured down to values as low as 0.05% or less.

The optical system shown in FIG. 1 may be readily modified to comparatively measure the transmittance characteristic of an unknown sample with respect to that of a standard reference. As shown in dotted outlines in FIG. 1, a transmission sample 53 and a transmission standard 54 are inserted between the respective light stops 19' and 19 and accordingly exposed to short pulses of light reflected from substantially white reflecting surfaces replacing 12 and 13. Pulses of light transmitted through 53 and 54 are alternately viewed by photocell 18 through gating shutter 20, and because of the high brightness value of the flash lamp pulses produced by lamp 10, high density samples may be accurately and reliably measured even with the use of relatively low sensitivity type solid state photosensors.

As indicated above, colorimetric and spectrophotometric transmittance characteristics of unknown samples may be measured by sequentially inserting appropriate tri-stimulus or spectrophotometric filters either immediately ahead of light conduit 18C or photocell 18.

In accordance with a further aspect of the present invention, pulsed-light photometric apparatus is provided for evaluating the chemical content and general physical condition of various organic materials such as vegetables, fruits, animal and human tissues etc. In the preferred method, an evaluation is effected by measuring the ratio of pulse light transmittance at one selected wavelength to the transmittance at a second selected wavelength. By way of example this method will be explained by describing apparatus for measuring the quality of ripened apples as illustrated in FIGS. 3A and 3B. The apparatus shown in FIG. 3A is adapted to instantaneously evaluate the quality of each apple 62 as it passes by on a high speed conveyor belt 60. High intensity short-duration light pulses from a properly synchronized broad spectrum flash lamp 10 are focused by condensing lens 61 onto the upper surface of each passing apple 62 and the light pulse transmitted through apple 62 is focused by lens 63 onto the sensitive surfaces of photosensors 65 and 66. Mirror 67 may be provided with a dichroic coating to reflect a predetermined wavelength or band of light energy to sensor 65 while transmitting the remaining wavelengths or narrow band of light energy to sensor 66. The quality of apple 62 is accurately evaluated by comparing the transmission of light having a wavelength known to be strongly attenuated by internal chlorophyll (i.e. 675 Nm.) with that for light energy at a wavelength that has minimum attenuation (i.e. 700 or 800 Nm.). Other quality characteristics of food articles may be evaluated by comparing or ratioing the light transmittance values at other predetermined different wavelengths. For example, the moisture content of apples is known to be a significant factor in evaluating their storage quality. In the apparatus shown in FIG. 3A, mirror 67 may be provided with a partially reflective coating and appropriate filters 65F and 66F may be inserted ahead of sensors 65 and 66 so that, for example, the light wavelength that is known to have a maximum absorption by water (0.97 or 1.94 microns) is transmitted to photosensor 65 and light energy having a wavelength in the neighborhood of 700 Nm. (minimum attenuation) is transmitted to photosensor 66.

The output pulses from 65 amplified by amplifier 70 are measured in peak amplitude by peak detector 71 and stored on capacitor 71C. In like manner, the output pulses from photosensor 66 amplified by amplifier 75 are measured in peak amplitude by peak detector 76 and stored on capacitor 76C. The stored output signals on 71C and 76C are amplified by logarithmic amplifiers 72 and 73 respectively, differentially compared by difference amplifier 80 and the resulting difference or ratio output signal is recorded on graph recorder 80G.

For high speed testing purposes, each apple 62 is securely held in a pocket by sponge rubber clamps 62C and transferred for rapid inspection by conveyor belt 60. Flash lamp 10 is properly synchronized, so as to expose each passing apple 62 to a very short-duration high brightness light pulse, by pickoff coil 90 which senses the passing of magnet 91 mounted on conveyor belt 60 a predetermined distance away from each pocket on the belt 60. Electrical pulses produced by pickoff 90 are supplied to trigger oscillator 85 the output of which triggers the discharge of stored electrical energy in pulse power supply 96 through lamp 10. Because the average output radiant energy of the flash lamp is low, damage to the objects that are inspected (e.g. apples) is avoided. At the same time, the high peak brightness of the light pulses from the flash lamp assures accurate and reliable evaluation of the transmittance characteristics of high density materials at the various wavelengths of interest.

A second pickoff coil 92 produces an output pulse with the passage of magnet 93 and this pulse is amplified by 94 and utilized to energize relay solenoid 95. The switch contacts of relay 95 are connected to discharge the stored signals on capacitors 71C and 76C when the relay solenoid is energized. Thus the stored signals are erased following the passage of each apple and the signal storage capacitors are thereby readied for the read-in and read-out of the next pulse light transmittance signals.

An alternative embodiment often preferred for maximum measuring accuracy provides that all pulse light transmittance measurements be made in time sequence with a single photosensor and a single amplifier and detector as illustrated in FIG. 3B. In this preferred embodiment, alternate light pulses transmitted through apple 62 are focused by lens 63 on the sensitive surface of single photosensor 65A through filters A and B in disc 66 rotatably driven by motor M. Where desired filter disc 66 may be mounted above the index table (as shown in dotted outline) between the light source and the object being measured. The individual apples 62 are supported on the surface of index table 60T. The drive system (not shown) is arranged to open and close switch 94 by the operation of cam 67 and thereby energize sync pulse commutator switch 95 mounted in contact with a 360° conductive commutator segment 96. The lower 180° commutator segment 97 is conductively joined to 96 and adapted to produce properly phased set and reset pulses for flip-flop 150 through the periodic switching contact with brush arms 96A and 96B. Output pulses from 150 are supplied to commutator switch 98 and synchronous demodulator 89 through pulse amplifier 166. Trigger pulses may be supplied to the flash lamp from 150 by the same circuit described and illustrated in connection with FIG. 7.

In accordance with a principal aspect of the present invention, a gated negative feedback circuit is provided for precisely controlling the D-C supply voltage for photosensor 65A (e.g. dynode multipliers) as a function of a selected fraction of the photosensor output signal produced during the viewing of a reference wavelength light pulse. As will be explained more fully below, the function of the feedback control circuit is to cause the single photosensor to effectively measure (in time sequence) the ratio of light transmittance of a given material at one wavelength with respect to the transmittance at a second wavelength.

To this end, switch 98A alternately connects the input of demodulator 99 to the top terminal and the slider arm of photosensor load potentiometer R. Commutator 95 is so phased that 98A is connected to the arm of R when photosensor 65A is looking through the reference filter B and is connected to the top of R when 65A is looking through filter A. Thus it will be seen that the arm of R functions to divide the amplitude of the reference pulse supplied to both the demodulator 99 and the feedback gate 98B. The divided reference pulse from 98B is connected to peak detector 50 which produces an output signal for controlling the output voltage supplied to 65A by D-C control tube 51. Accordingly, the D-C voltage supplied to 65A is caused to vary inversely in amplitude as a function of the reference pulse amplitude gated by 98B to peak detector 50.

To compensate for differences in light output from the lamp and transmission through filters A and B at the different wavelengths $\lambda_A$ and $\lambda_B$, the arm of R is advantageously adjusted so that the output signal $e_0$ from difference amplifier 52 is zero with no apple in pulse light beam.

When an apple is then placed in position, the light pulses reaching the photosensor through filters A and B are greatly attenuated and through the action of the feedback control circuit described above, the gain of 65A is proportionally increased.

The operation of the feedback control circuit to provide an accurate ratio or percentage difference output signal $e_0$ can be explained as follows. Assuming that the photosensor sensitivity equals K the decimal part of the potentiometer (R) that is used equals M, the photosensor output pulses looking through filters A and B equal $E_A$ and $E_B$ corresponding to transmittance values $T_A$ and $T_B$ respectively, then $$e_0 = ME_B - E_A \qquad (1)$$

and $$e_0 = K(MT_B - T_A) \qquad (2)$$

Through the operation of the negative feedback control circuit $$KMT_B = C \text{ (constant)} \qquad (3)$$

$$K = \frac{C}{MT_B}$$

And by substitution of (3) in (2):

$$e_0 = \frac{C(MT_B - T_A)}{MT_B} \qquad (4)$$

From the foregoing it can be readily appreciated that the feedback control circuit causes the photosensor to automatically behave as a ratio measuring device and the operation of the potentiometer R functions to eliminate ambient variations such as differences in the transmittance characteristics of the A and B filters and in the light output from the flash lamp at $\lambda_A$ and $\lambda_B$. Further, from Equation 4 it will be appreciated that by measuring the percentage difference in the transmittance values $T_B$ and $T_A$, wide variations in absolute attenuation of the test material are effectively wiped out as are changes in amplifier gain etc.

Referring to FIG. 4, there is illustrated in simplified form, a pulse light colorimeter adapted to measure the color reflectance characteristics of each repeated pattern area 100 printed on a continuously moving sheet 105 by offset printer roll 110. Each repeated pattern 100 is illuminated by a synchronized light pulse supplied by flash lamp 10 through condenser lens 106 field stop 99, and field lens 111. The short pulse of light reflected from each pattern 100 is focused on photocell 140 by lens 108 through an appropriate color filter 112.

In a preferred operational embodiment of the apparatus shown in FIG. 4, photocell 140 and flash lamp 10 are preferably mounted in a common head 107 that is supported for travel at right angles to the longitudinal direction of travel for the printed sheet. As illustrated, lens system 111 and 108 are accordingly arranged to focus on a common spot on the print surface along the transverse axis A—A.

Axis A—A is located a predetermined distance X from the axis of rotation of the offset roll 110. To assure accurate synchronization or "strobing" of the flash lamp source during the passage of each printed pattern 100 across transverse axis X, a magnetic pickoff is provided comprising coils 116A and 116B and permanent magnets 117A, 117B mounted on disc 119 which is driven by printer roll shaft 120. Magnets 117A and 117B are preferably secured to disc 119 by movable clamps so that the timing or phasing of the trigger pulses produced in pickup coil 116A and 116B may be readily adjusted. Accordingly magnets 117A and 117B may be angularly adjusted with respect to the drive shaft 120 and the print pattern on printer roll 110 so as to provide the desired offset for triggering lamp 10 when print pattern 100 has traversed a distance X from the center line of the axis of rotation for print roll 120. For purposes of simplifying the drawing, the conventional engraved ink supply roll for 120 has been omitted.

For operational convenience, field stop 99 is preferably washer shaped (as shown in FIG. 5) with an open center surrounded by a darker ring having reduced light transmission. The outer diameter of the stop image 99i should preferably be about one inch with the bright center spot having a diameter of approximately one-half inch. Lens 108 is focused and properly aligned to image field-stop 141 within the bright central spot of 99i as shown at 141i in FIG. 5. The proper strobe phasing of image 99i with respect to the image area of interest is readily effected by manual rotation of the pickup coils 116A or 116B with respect to magnets 117A and 117B. As indicated above the entire head assembly is supported on an appropriate traverse mount so that by visually aiming the stop image while adjusting the pickup coils the reflectance of any spot on the print surface may be selected by the operator and measured as it passes axis A—A.

As shown in FIG. 7 synchronizing pulses produced by pickoff coils 116A and 116B are supplied to a conventional bi-stable flip-flop 150. Coil 116A is mechanically phased with respect to the print roll so as to produce a flash lamp trigger pulse when an unprinted surface (e.g. white) is present at A—A and 116B is phased to produce a trigger pulse when the desired inked area is present at A—A. Accordingly the respective trigger pulses from 116A and 116B set and reset flip-flop 150. Output pulses pulses from 150 are supplied to pulse light trigger 160 through "or" diodes 161 and differentiator 162. Flash lamp supply 165 is advantageously energized by a delayed output pulse from 160 whereas the solenoid coil of synchronous switch 170 and synchronous demodulator 175 are directly energized by the amplified undelayed pulses from 150.

Output signal pulses from photosensor 140 corresponding to the light pulses alternately reflected from the unprinted (e.g. white) and printed areas are developed across potentiometer 171. Arm "A" of relay switch 170 is connected to alternately switch the input of amplifier 176 between the arm and the upper terminal of potentiometer 171. In operation, the potentiometer arm is adjusted so that the "white" pulse 180 and the "ink" pulse 181 have the same amplitude when the ink layer has the desired thickness or density. In the preferred embodiment, pulses 180 and 181 are separately integrated and differentially compared by differential comparator 185. The individual integrating circuits may comprise conventional RC integrating circuits having relatively long time constants compared to pulse time duration so that the resultant or output signals represent the integral of total energy in each of the input pulses (i.e., 180, 181). The difference of error signal is supplied to recorder 190 and may also be utilized where desired to energize a servo controlled ink supply roller to automatically correct for errors or variations in ink thickness. The error signal may also be supplied to a conventional servo amplifier and motor drive control (not shown) for automatically positioning potentiometer 171 so that the output error signal is continuously maintained at a null or zero value. The sample reflectance (or transmittance) value may then be readily read from a calibrated dial indicating the position of potentiometer 170.

The D-C supply voltage to photosensor 140 is advantageously controlled by a gated negative feedback circuit identical in its operation to that described in connection with FIG. 3B. In this embodiment of the invention, however, the photosensor sensitivity is controlled inversely as a function of the "white" pulse amplitude developed between the arm of 171 and ground and the percentage difference between the ratio of printed and unprinted reflectance values is measured and recorded by recorder 190. Accordingly, "white" pulses are synchronously switched by the "B" contacts of switch 170 to peak detector 195 which produced a variable D-C control voltage supplied to photosensor 140 by a D-C control tube 196.

As indicated above, the arm of potentiometer 171 is normally adjusted so that the output error signal $e_o$ is zero for a desired ink thickness. The dial on potentiometer 171 may be advantageously calibrated to directly read the percentage difference in reflectance between the inked surface and the uninked or white surface, and the ratio of the difference in reflectance values with respect to the white reference reflectance is recorded by recorder 190. Thus variations in the reflectance value of the unprinted surface are effectively cancelled out in each measurement and only percentage variations in the actual ink thickness are recorded.

In order to obtain optitmum sensitivity to variations in ink thickness, filter 112 should be selected to provide a peak response in that portion of the spectrum having maximum attenuation or absorption by the ink as illustrated in FIG. 6, for a yellow ink, filter 112 should produce maximum photosensor response in the blue portion of the spectrum.

Referring to FIG. 4A, there is shown an alternative arrangement for producing flash synchronizing pulses comprising a photo-cell 200 with lens 201 which is arranged to scan fiduciary marks 205 printed along the outer edge of sheet 105. The amplified pulses from photo-cell 200 are advantageously supplied to a variable time-delay 210 which provides a convenient means for adjusting the strobe-light phasing so that any portion of the printed pattern may be readily illuminated. In the printing of individual cartons or separate sheets, reference trigger pulses generated by scanning the leading edges of each individual sheet may advantageously be utilized to control the flash lamp.

While the invention has been particularly shown and described with reference to several preferred embodiments thereof, it will be understood by those skilled in the art that various changes in form and detail may be made therein without departing from the spirit and scope of the invention.

What is claimed is:

1. Apparatus for measuring the ratio of the light reflectance of a printed area on a moving sheet to the reflectance of an unprinted area thereon, said apparatus comprising:

means for generating electrical pulses synchronized with the movement of said sheet for triggering a flash lamp to illuminate predetermined spots on said printed and unprinted areas of said moving sheet, flash lamp means triggered by said synchronized electrical pulses to produce low duty cycle short-duration high intensity light pulses for illuminating a small spot on said printed and unprinted areas, photosensor means positioned for sensing the pulses of light reflected from the small illuminated spots on said printed and unprinted areas and for producing electrical output pulses corresponding in amplitude to the respective reflectance values thereof, circuit means including indicator means coupled to said photosensor means for measuring the ratio of the amplitudes of said electrical output pulses.

2. Apparatus for measuring the light reflectance of a predetermined pattern area on a moving object supported for movement along a given path on a driven conveyor, said apparatus comprising:

electro-mechanical means associated with said driven conveyor for generating electrical pulses synchronized with the movement of said pattern area for triggering a flash lamp in time synchronization with the passage of each pattern across a predetermined spot of said path, flash lamp means mounted adjacent said conveyor triggered by said synchronized electrical pulses to produce low duty cycle short-duration high intensity light pulses, optical means associated with said flash lamp for focusing said light pulses on said small predetermined spot of said path, photosensor means positioned for sensing the pulse of light reflected from each spot and for producing electrical output pulses corresponding in amplitude to the reflectance of said pattern, and circuit means including indicator means coupled to said photosensor means for measuring the amplitude of said output pulses.

3. Apparatus for measuring the light transmittance of a predetermined area on a moving object supported for movement along a given path on a driven conveyor, said apparatus comprising:

electro-mechanical means associated with said driven conveyor for generating electrical pulses synchronized with the movement of said area for triggering a flash lamp in time synchronization with the passage of each pattern across a predetermined spot of said path, flash lamp means mounted adjacent said conveyor triggered by said synchronized electrical pulses to produce low duty cycle short-duration high intensity light pulses, optical means associated with said flash lamp for focusing said light pulses on said small predetermined spot of said path, photosensor means positioned for sensing the pulse of light transmitted by said area and for producing electrical output pulses corresponding in amplitude to the transmittance of said area, and circuit means including indicator means coupled to said photosensor means for measuring the amplitude of said output pulses.

References Cited

UNITED STATES PATENTS

| | | |
|---|---|---|
| 2,181,879 | 12/1939 | Edgerton. |
| 2,251,973 | 8/1941 | Beale et al. |
| 2,686,452 | 8/1954 | Bentley _____ 250—228 X |
| 2,992,588 | 7/1961 | Henderson. |
| 3,089,382 | 5/1963 | Hecht et al. |
| 3,111,555 | 11/1963 | Dykeman et al. |
| 3,157,789 | 11/1964 | Thomas. |
| 3,170,022 | 2/1965 | Reesen. |

FOREIGN PATENTS 908,896    3/1959    Great Britain.

OTHER REFERENCES

Gates, An Automatic Recording Saccharimeter, Chemistry and Industry, Feb. 15, 1958, pp. 190–193.

RONALD L. WIBERT, Primary Examiner

W. A. SKLAR, Assistant Examiner

U.S. Cl. X.R.

250—205, 228; 356—211